United States Patent
Holmes et al.

(10) Patent No.: US 6,976,703 B2
(45) Date of Patent: *Dec. 20, 2005

(54) STATIC DRIVER AIRBAG MODULE USING STEERING WHEEL MOUNTED GEARS

(75) Inventors: Francis J. Holmes, Beavercreek, OH (US); Barry C. Worrell, Centerville, OH (US); Joseph M. Johnson, Huntington Woods, MI (US); George Frank Richards, Springfield, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/040,868

(22) Filed: Jan. 21, 2005

(65) Prior Publication Data

US 2005/0156415 A1    Jul. 21, 2005

Related U.S. Application Data

(63) Continuation of application No. 10/227,591, filed on Aug. 23, 2002.

(60) Provisional application No. 60/379,449, filed on May 10, 2002, provisional application No. 60/332,637, filed on Nov. 6, 2001, provisional application No. 60/327,339, filed on Oct. 5, 2001.

(51) Int. Cl.[7] .............................................. B60R 21/16
(52) U.S. Cl. ..................................................... 280/731
(58) Field of Search ........................... 280/731, 728.2; 74/552

(56) References Cited

U.S. PATENT DOCUMENTS

| | | | |
|---|---|---|---|
| 2,699,034 A | 1/1955 | Maire | 58/46 |
| 3,546,874 A | 12/1970 | Nevett | 180/78 |
| 3,744,817 A | 7/1973 | Oussett | 280/150 AB |
| 3,910,597 A | 10/1975 | Seko | 280/150 AB |
| 4,561,324 A | 12/1985 | Hiramitsu et al. | 74/498 |
| 4,598,602 A | 7/1986 | Kurata et al. | 74/484 R |
| 4,604,912 A | 8/1986 | Sugita et al. | 74/484 |
| 4,625,578 A | 12/1986 | Nishijima | 74/802 |
| 4,759,235 A | 7/1988 | Hiramitsu et al. | 74/802 |
| 4,771,650 A | 9/1988 | Kerner | 74/498 |
| 4,932,285 A | 6/1990 | Tsukamoto | 74/552 |
| 5,010,784 A | 4/1991 | Nakazato et al. | 74/498 |
| 5,152,358 A | 10/1992 | Kozuka | 180/78 |
| 5,558,365 A | 9/1996 | Oe et al. | 280/731 |
| 6,142,504 A | 11/2000 | Papandreou | 280/728.2 |
| 6,161,866 A | 12/2000 | Ryan et al. | |
| 6,168,186 B1 | 1/2001 | Welch et al. | |
| 6,203,061 B1 | 3/2001 | Neiderman et al. | |
| 6,196,582 B1 | 4/2001 | Sparkman et al. | |
| 6,213,502 B1 | 4/2001 | Ryan et al. | |
| 6,247,726 B1 | 6/2001 | Ryan | |

(Continued)

FOREIGN PATENT DOCUMENTS

JP          05170046 A     7/1993

Primary Examiner—Faye M. Fleming
(74) Attorney, Agent, or Firm—Scott A. McBain

(57) ABSTRACT

A gear system for coupling a steering wheel to a steering wheel shaft, comprising: a first gear rotatable about a first axis and connected to the steering wheel, wherein rotation of the steering wheel causes rotation of the first gear; a second gear engaged to the first gear and configured to rotate about another axis when the steering wheel is rotated, wherein the another axis is displaced from the first axis; and a housing disposed about the gear system, wherein the housing remains in a stationary position during rotation of the steering wheel.

20 Claims, 10 Drawing Sheets

U.S. PATENT DOCUMENTS

| | | |
|---|---|---|
| 6,260,330 B1 | 7/2001 | Borowski et al. |
| 6,286,858 B1 | 9/2001 | Shepard et al. |
| 6,331,015 B1 | 12/2001 | Doxey et al. |
| 6,361,064 B1 | 3/2002 | Hopf et al. |
| 6,390,501 B1 | 5/2002 | Greib et al. |
| 6,409,213 B2 | 6/2002 | Webber et al. |
| 6,422,589 B1 | 7/2002 | Ostermann et al. |
| 6,422,597 B1 | 7/2002 | Pinsenschaum et al. |
| 6,431,596 B1 | 8/2002 | Ryan et al. |
| 6,435,541 B1 | 8/2002 | Thomas et al. |
| 6,439,603 B2 | 8/2002 | Damman et al. |
| 6,454,300 B1 | 9/2002 | Dunkle et al. |
| 6,299,765 B1 | 12/2002 | Hawthorn et al. |
| 6,554,318 B2 | 4/2003 | Kohut et al. |
| 6,561,545 B2 | 5/2003 | Greib et al. |
| 6,592,146 B2 | 7/2003 | Pinsenschaum et al. |
| 6,626,455 B2 | 9/2003 | Webber et al. |

# STATIC DRIVER AIRBAG MODULE USING STEERING WHEEL MOUNTED GEARS

CROSS REFERENCE TO RELATED APPLICATIONS

This application is a continuation of U.S. patent application Ser. No. 10/227,591, filed on Aug. 23, 2002, the contents of which is incorporated herein by reference thereto.

TECHNICAL FIELD

This invention relates to an automotive steering wheel-airbag module assembly wherein the airbag module remains in a stationary position during rotation of the steering wheel.

BACKGROUND

Air bags mounted in an instrument panel or steering wheel have become standard in the automotive industry. Numerous variations of these air bags, and their deployment systems and housing devices have evolved over the years. Current steering wheel-airbag module assemblies rotate in unison as an assembly on a steering shaft or column. Such a steering column configuration does not allow for stationary or static steering wheel mounted automotive controls and gages; nor does the configuration allow for a driver's side air bag module that remains in a stationary position with respect to the automobile during rotation of the steering wheel.

SUMMARY

An automotive steering wheel-airbag module assembly is disclosed. The automotive steering wheel-airbag module assembly comprises a rotatable steering wheel encompassing an accessible space; a gear system coupled to the steering wheel and to a steering shaft or column for transferring torque applied to the steering wheel directly to the steering shaft or column. An airbag module is positioned within the accessible space encompassed by the steering wheel, wherein the airbag module remains in a stationary position during rotation of the steering wheel.

DETAILED DESCRIPTION OF THE INVENTION

Figure 1:
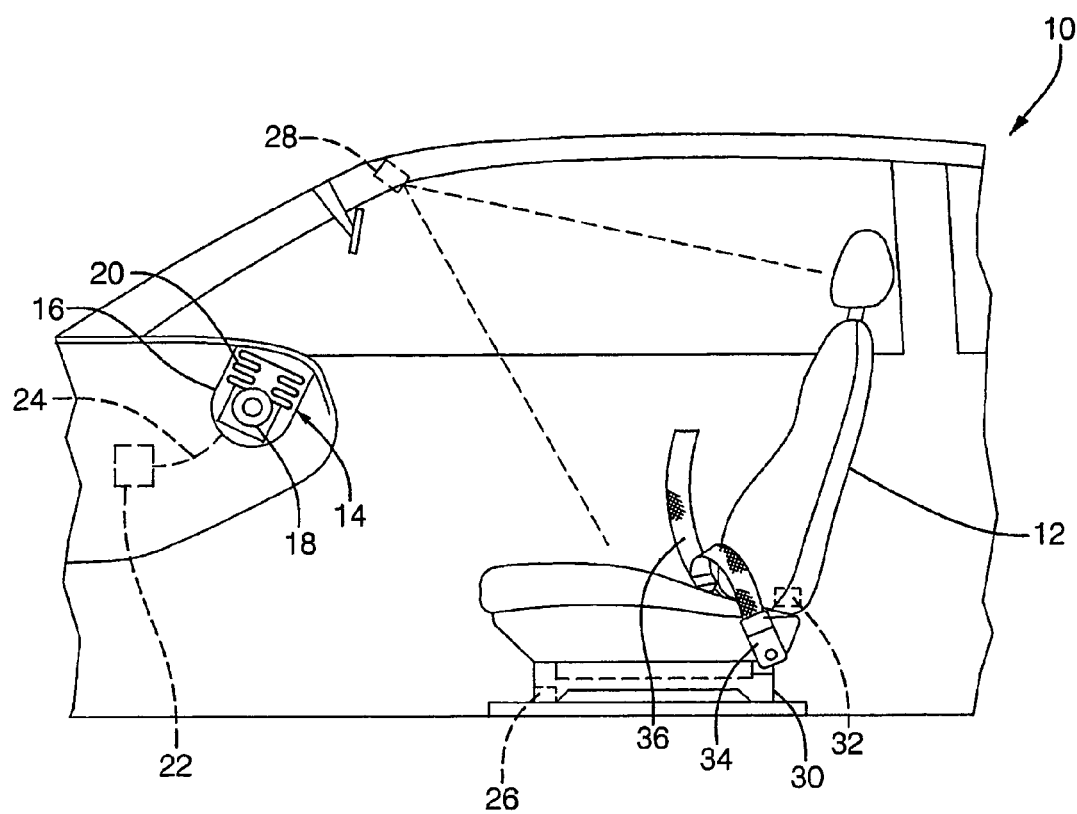
FIG. 1 is a schematic view of a vehicle interior showing an air bag cushion in a stored or undeployed state.

Referring now to the Figures, for purposes of illustrating an air bag system, a portion of a vehicle 10 is illustrated in FIG. 1. Included in an interior compartment of vehicle 10 are a seating structure 12 and an airbag module 14 disposed in a spatial relationship with respect to seating structure 12. The airbag module 14 comprises a housing 16, an inflator 18, and an inflatable airbag or inflatable cushion 20 in an undeployed configuration. The module 14 is positioned in the vehicle 10 for deployment of the inflatable cushion 20 inboard of the vehicle (e.g., towards the seating structure 12). A sensor or sensing-and-diagnostic module 22 is adapted to detect an activation event to provide a command signal 24 to the inflator 18. Thus, the command signal 24 controls the activation of the airbag module 14.

The inflatable cushion 20 is stored in a folded or undeployed position in the housing 16, and is in fluid communication with the inflator 18. Upon detection of an activation event by the sensing-and-diagnostic module 22 the inflator 18 is activated via command signal 24 to generate an inflation gas. The inflation gas inflates and expands the inflatable cushion 20 from the housing 16 into the interior of the vehicle 10. It should be recognized that the module 14 is illustrated by way of example only as being included in the dashboard of the vehicle 10. Of course, it is contemplated that the module 14 may be installed for deployment in other regions of the vehicle 10, such as, but not limited to the steering wheel (FIGS. 2 and 3), the seat, the A-pillar, the roof, and other locations.

The sensing-and-diagnostic module 22 is also adapted to detect one or more loads on the seating structure 12, a position of the seating structure, an angle of a portion of the seating structure with respect to another portion, the distance the seating structure is from the airbag module 14, and other data that is related to the deployment of the inflatable cushion 20 and usable in other deployment technology. For example, the sensing-and-diagnostic module 22 receives input from a plurality of sensors such as a seat position sensor 26, an optical scanner 28, a load sensor 30, a seat recline sensor 32, and a seat belt use detection sensor 34. All of the sensors are positioned to be able to provide input signals to module 22.

Figure 2:
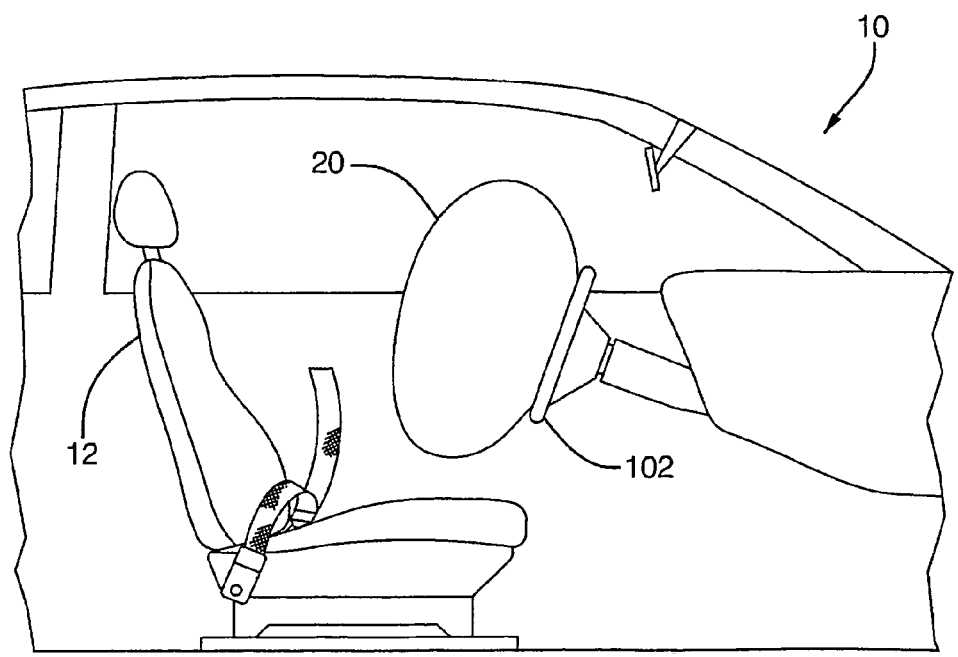
FIG. 2 is a schematic view of a vehicle interior showing an air bag cushion in a deployed state.

The seat position sensor detects the position or distance of seating structure 12 with respect to the airbag module 14 (e.g., seat position full forward, one-third forward, full rearward with respect to the module, and the like). Similarly, the optical scanner 28 is used to detect the position of seating structure 12. The load sensor is disposed within the seating structure 12 and is used detect the load on the seating structure. Thus, load sensor 30 is capable of detecting the specific weight or load on a portion of seating structure 12. The seat recline sensor 32 is used to detect the degree or angle to which an upper or back portion of the seating structure 12 is reclined or positioned with respect to a lower or seat portion of seating structure 12. The seat belt use detection sensor 34 is used to determine whether the seat belt 36 is secured (e.g., whether the seat belt buckle is inserted into its corresponding clasp). FIG. 2 shows the inflatable cushion or air bag 20 installed in steering wheel and in a deployed state in relation to the interior of the vehicle 10.

In FIGS. 3, 4, 5 and 14 a steering wheel assembly according to an exemplary embodiment of the present application is shown generally at 100. The steering wheel assembly is configured to provide a stationary platform for a driver side airbag module (FIG. 2) having one possible operating protocol as described in the preceding paragraphs referring to FIGS. 1 and 2. The steering wheel assembly 100 includes a steering wheel 102, which encompasses an accessible volume or space 182 into which the airbag module 14 may be placed. A gear system 104 is in connection with the steering wheel 102 via struts or armatures 142. The gear system 104 is also coupled to a thread set 114 of a steering shaft or column 106 via a hub 112 in a spur gear 110. The spur gear 110 is in intimate and mutual engagement with a ring gear 108 (or internal spur gear) such that a torque applied to the steering wheel 102 is transmitted to the steering shaft or column 106 directly through the gear system 104. Such rotation of the steering shaft or column 106 is in the same direction as the rotation of the steering wheel steering wheel 102. As seen in FIGS. 3, 4, 5 and 14, the spur gear 110 is positioned within the ring gear 108 such that the axis 144 (FIG. 4) of the steering wheel 102 and ring gear 108 is offset from the axis 140 of the steering shaft or column 106. The gear ratio between the spur gear 110 and the ring gear 108 is typically about 3:4.

The steering wheel assembly 100 further includes a housing 116, 118 encompassing the gear system 104. The housing 116, 118 comprises a first plate 116 and a second plate 118 mated by fasteners 126, 126a. First and second plates 116, 118 each include a window or aperture 120, 122 for allowing passage of electronic connections and instrumentation associated with the deployment of the airbag 152 (FIG. 2) and other automotive functions to be effected.

Housing 116 includes a plurality of apertures configured to receive and engage through the use of a biasing member a plurality of airbag module fasteners, which depend downwardly from a lower portion of an airbag module which is to be secured within space 182. For example, one such method and/or apparatus for securing a driver's side airbag is illustrated in U.S. Pat. No. 5,409,256 the contents of which are incorporated herein by reference thereto. Of course, other methods are contemplated for use with the present application. Thus, the housing provides a means for securing the driver's side airbag module to the steering wheel.

In addition, and as will be discussed in more detail below housing 116 and 118 remain stationary with respect to the vehicle as the steering wheel is rotated and this rotation is effected to the steering column. Accordingly, the driver's side air bag module remains stationary allowing for design modifications not feasible in rotating airbag modules.

For example, and since stationary apertures 120 and 122 are available a direct electrical connection to the air bag module, horn, cruise control and other switches is attainable. This negates the need for a clock spring coil or other electrical connections used in rotating steering wheels and air bag arrangements of the prior art. For example, the clock spring coil and/or the teachings of U.S. Pat. No. 5,498,164 and the prior art disclosed and discussed in U.S. Pat. No. 5,498,164. Due to the configuration of gear system 104, apertures 120 and 122 remain stationary as steering wheel 102, and accordingly, steering shaft 106 are rotated. The steering wheel assembly 100 also includes various seals, bearings and fasteners 124, 128, 130, 132, 134, 136 138 for assembly of the steering wheel assembly 100. The airbag module 14 (not shown in FIGS. 3, 4, 5 and 14) is attached to the first plate 116.

Figure 3:
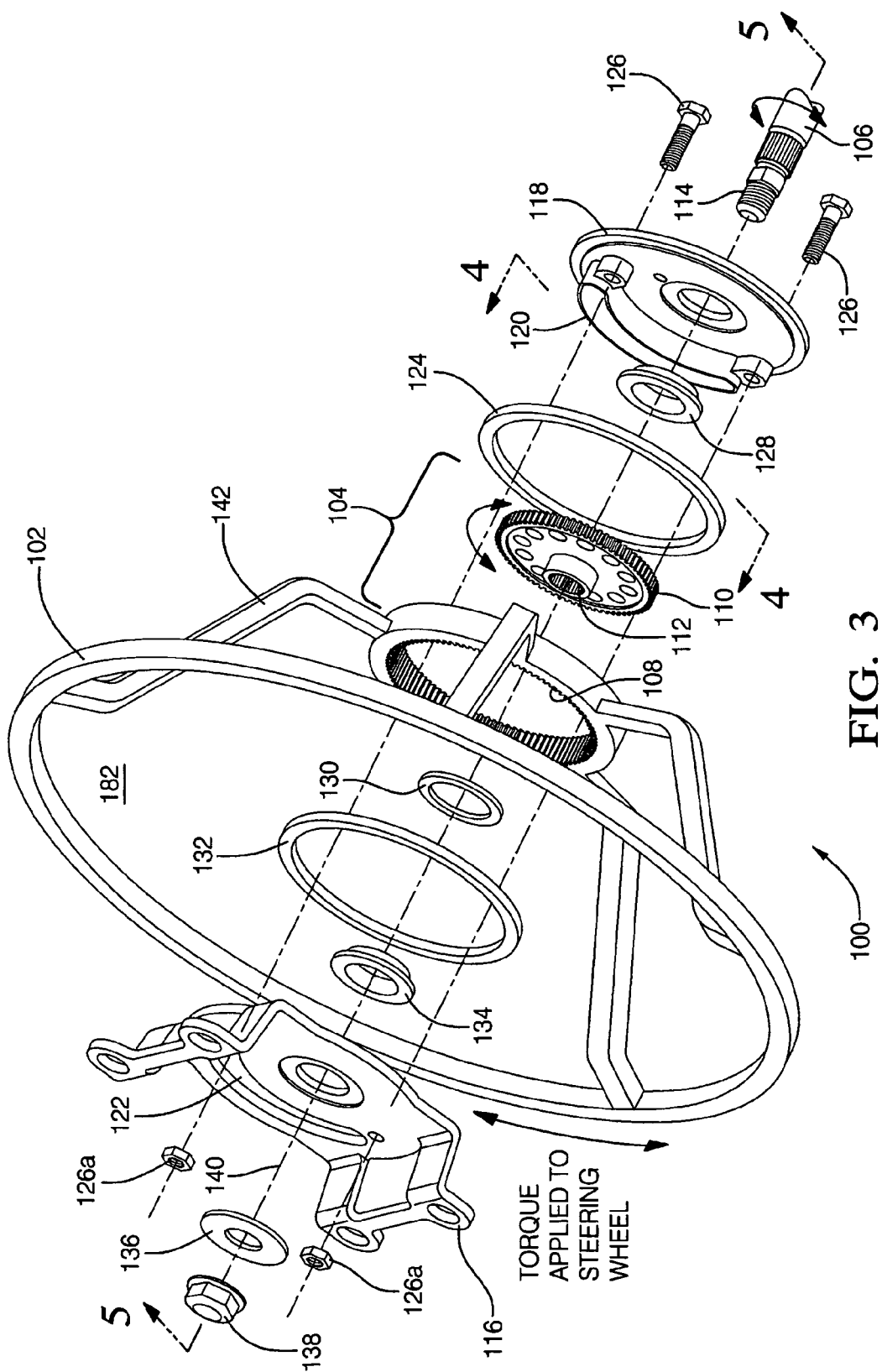
FIG. 3 is an assembly drawing of a steering wheel assembly.
Figure 5:
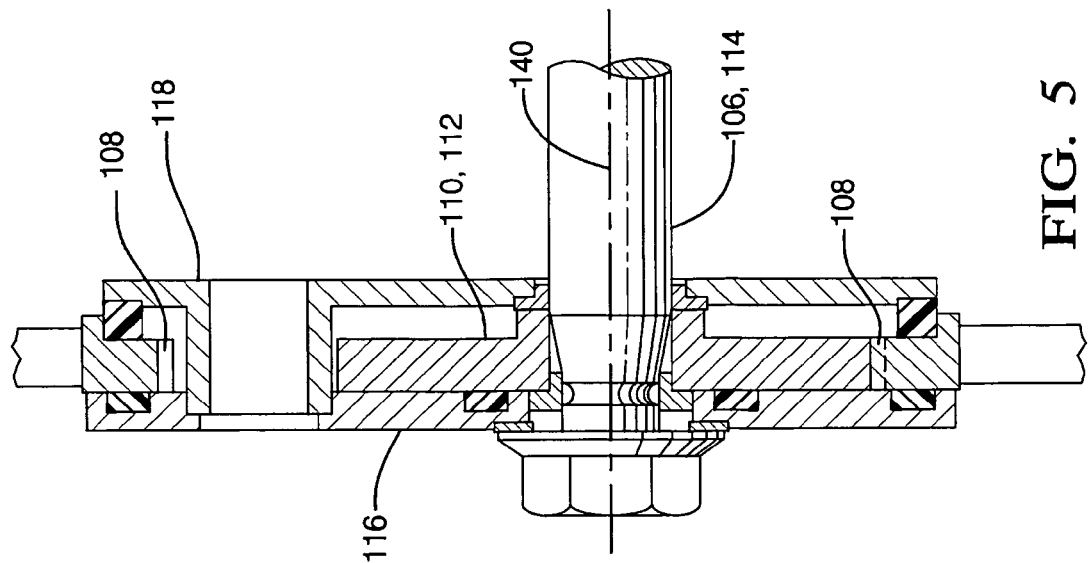
FIG. 5 is a cross sectional view of the hub of the steering wheel assembly of FIG. 3.
Figure 4:
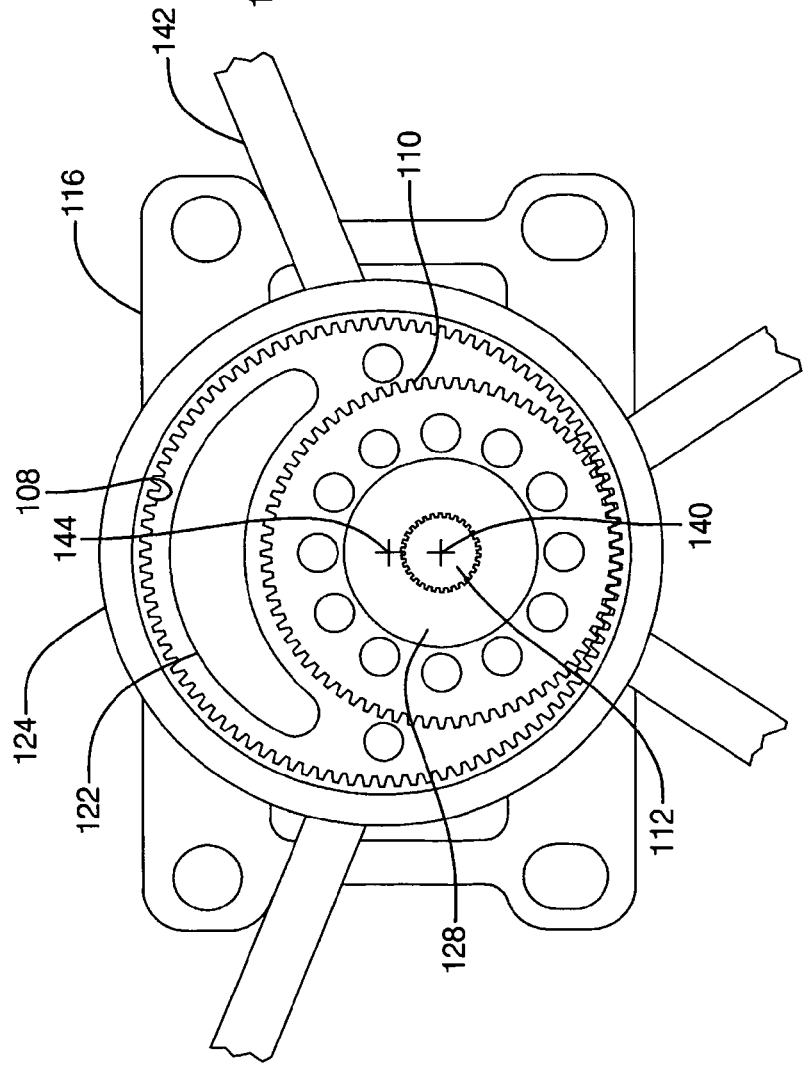
FIG. 4 is a first sectional view of the steering wheel assembly of FIG. 3.
Figure 6:
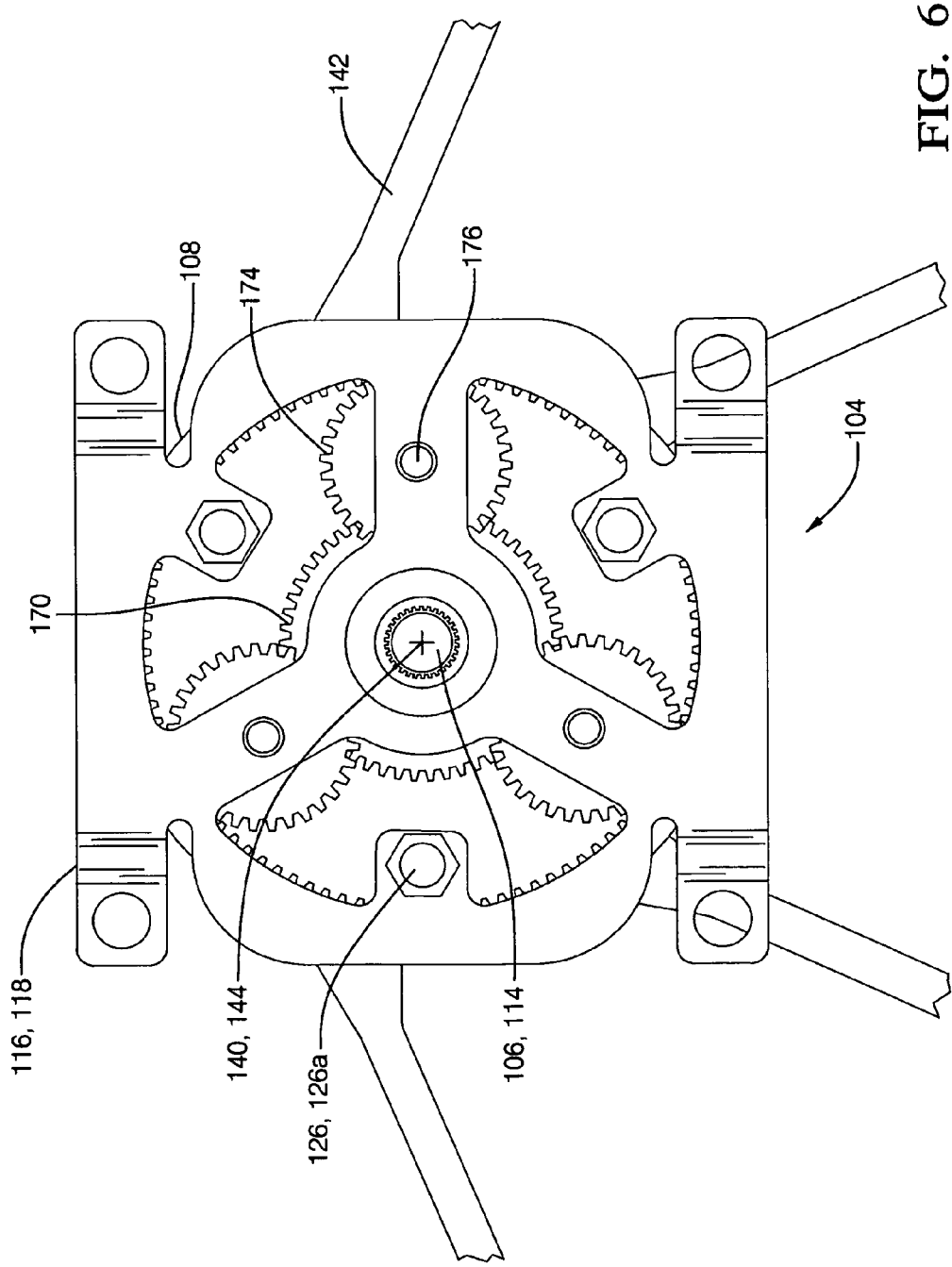
FIG. 6 is a sectional view of the steering wheel assembly of FIG. 3 having a planetary gear system.

FIG. 4 shows a sectional view of the steering wheel assembly 100 of FIG. 3 as viewed along the center line 140, and FIG. 5 is a cross sectional view of the steering wheel assembly 100 of FIG. 3. As seen in FIG. 4, spur gear 110 is smaller than the ring gear 108 and thus has a gear ratio greater than 1.00, and a rotation of the steering wheel 102 of say 90 degrees results in a rotation of a road wheel of greater than ninety degrees. In order to compensate for this, corrective measures can be instituted at the rack in the steering system. For example, the gear ratio at the steering column to the actuating device (e.g. rack) is adjusted to provide a complimentary rotation. In addition, and in systems where "steer-by-wire" systems are employed, the adjustment is more of a signal variation or adjustment as opposed to a mechanical adjustment. Of course, this system is contemplated for use in both mechanical steering systems, "steer-by-wire" systems, combinations thereof and other equivalents.

Figure 14:
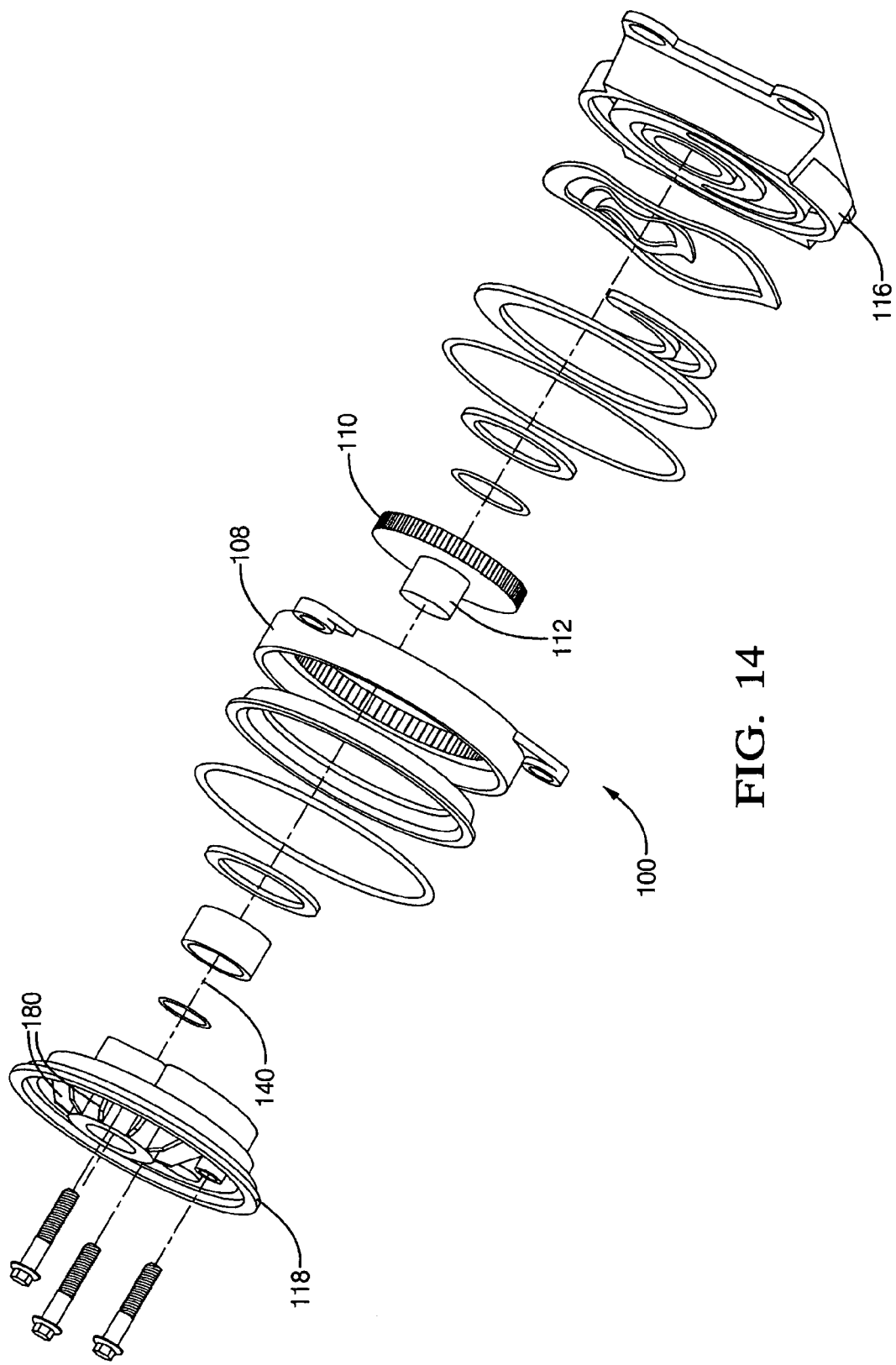
FIG. 14 is an assembly drawing of a steering wheel assembly.

As best understood from FIGS. 3, 4, 5 and 14, the housing 116, 118 encompasses the gear system 104 and is assembled by fasteners 126, 126a such that the housing 116, 118, and the airbag module 14, are fixed to the vehicle 10 and thus, remain in a stationary position with respect thereto during the clockwise or counterclockwise rotation of the steering wheel 102. As seen in FIG. 14, housing part 118 includes a set of ribs 180 radiating outward from axis 140 for added strength in housing part 118 and the housing in general. Ribs 180 are added to provide structural support about the area surrounding opening 120 where it is not possible to pass bolts 126 therethrough.

In FIGS. 6–11 and 12 an alternative embodiment of the present application is shown where the gear system 104 comprises a planetary gear system. The planetary gear system 104 comprises a sun gear 170 coupled to the thread set 114 of the steering shaft or column 106, wherein the axis 144 of the steering wheel 102 is coaxial with the axis 140 of the steering shaft or column 106. A first set of planet gears 174 are rotatable about a set of axes 176 and are in intimate and mutual engagement with the ring gear 108. A second set of planet gears 178, also rotatable about the set of axes 176, in unison with the first set of planet gears 174, is in intimate and mutual engagement with the sun gear 170. Thus, torque applied to the steering wheel 102 is transmitted to the steering shaft or column 106 directly through the planet gear system 104. The resultant rotation of the steering shaft or column 106 is in the opposite direction as the rotation of the steering wheel 102.

Alternatively, planet gears 174, 178 may be arranged to provide a reversal of rotation between gears 174 and 178 wherein the resulting rotation of column 106 is in the same direction as steering wheel 102. Typical gear ratios between the first set of planet gears 174 and the ring gear 108 are about 1:3, and between the second set of planet gears 178 and the sun gear 170 are about 1:3. Of course, and as applications may require, the gear ratios may be greater or less than 1:3.

Figure 7:
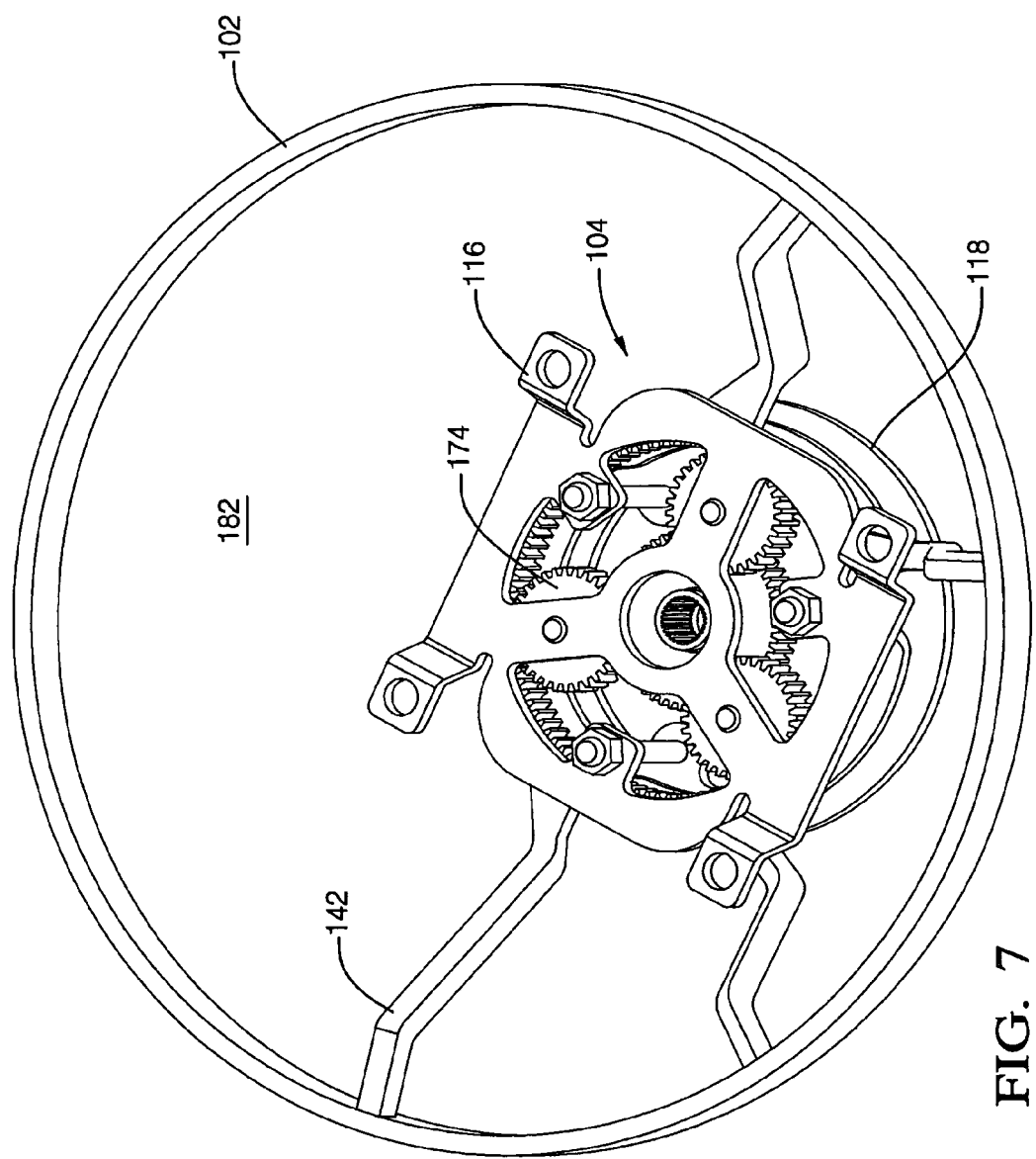
FIG. 7 is a three dimensional view of the steering wheel assembly of FIG. 3 having a planetary gear system.
Figure 8:
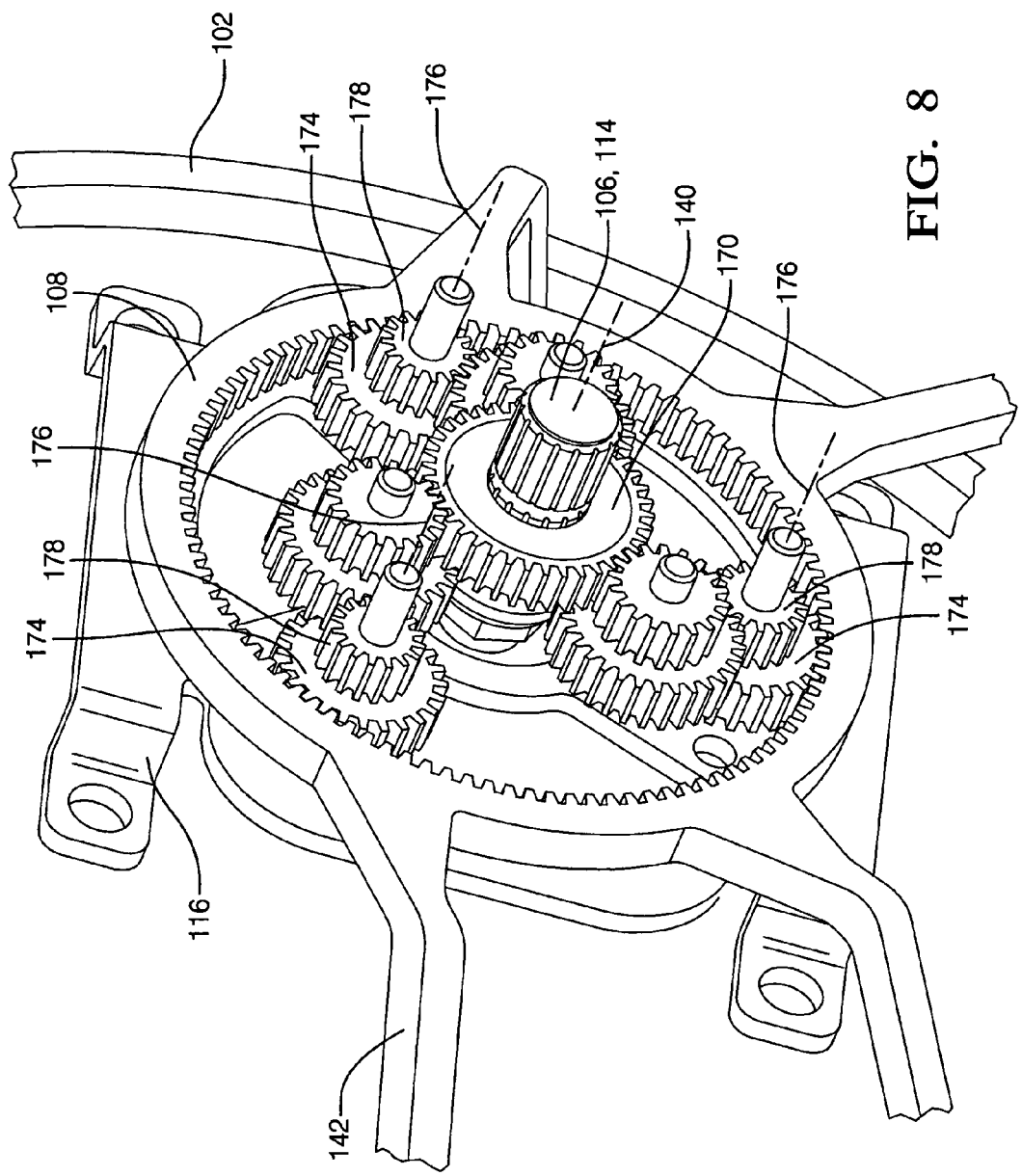
FIG. 8 is a three dimensional view of the steering wheel assembly of FIG. 3 having a planetary gear system.
Figure 9:
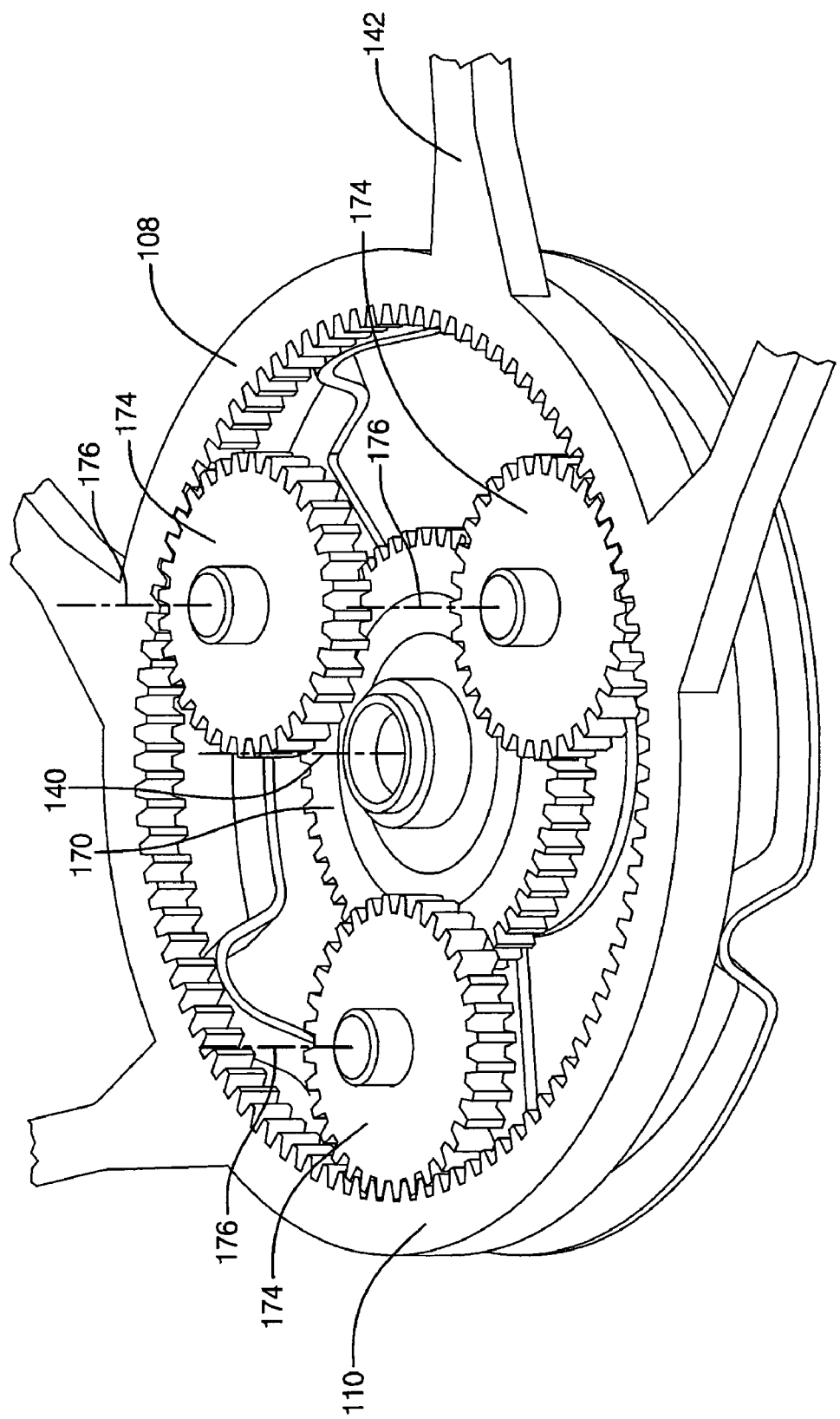
FIG. 9 is a view of the planetary gear system of FIGS. 7 and 8.
Figure 10:
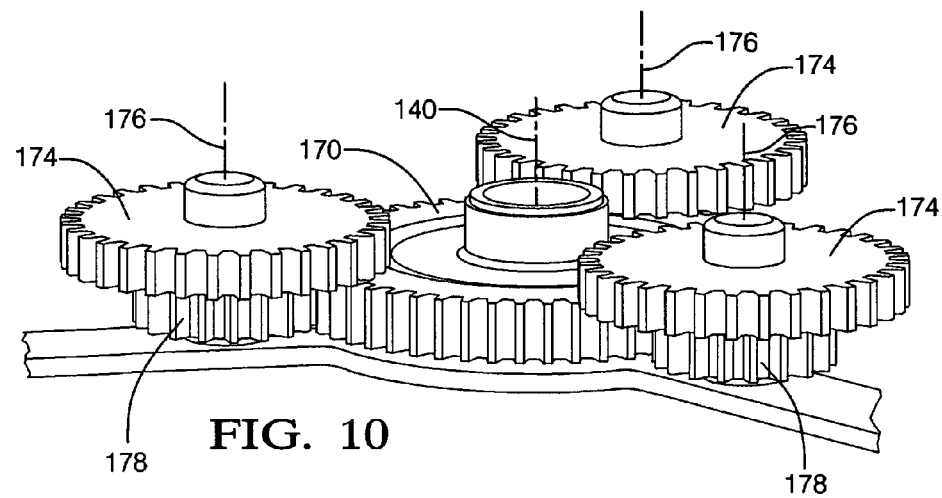
FIG. 10 is a view of the planetary gear system of FIGS. 7 and 8.
Figure 11:
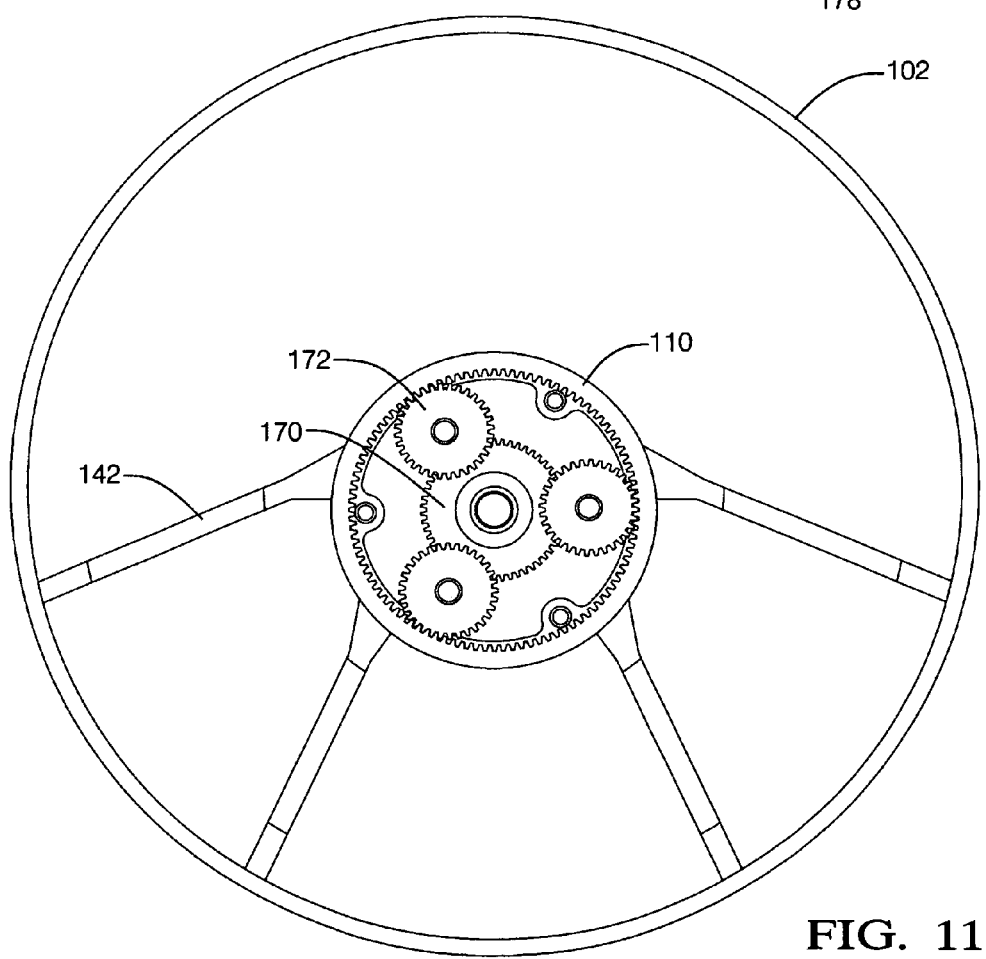
FIG. 11 is a view of the planetary gear system of FIGS. 7 and 8.
Figure 12:
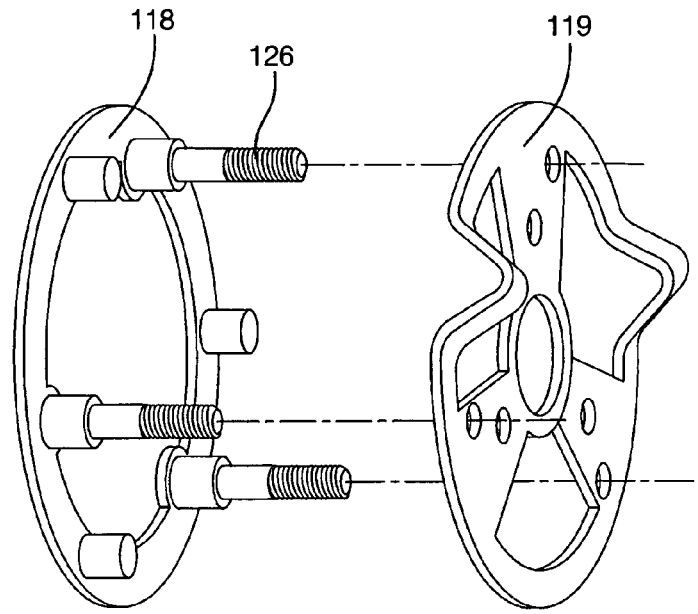
FIG. 12 is a partial view of the housing of the planetary gear system of FIGS. 7 and 8.

As best understood from FIG. 7, the housing 116, 118 encompasses or encloses the planetary gear system 104 and is assembled by fasteners 126, 126a (FIG. 3) such that the housing 116, 118 is capable of being fixed in a stationary position with respect to the vehicle 10 (FIGS. 1 and 2) and thus, remains in a stationary position with respect to the vehicle 10 during the clockwise or counterclockwise rotation of the steering wheel 102. In this embodiment there is an even, or one-to-one, rotation ratio with respect to the steering wheel 102 and steering column. Thus, no adjustment is necessary at the steering column to road wheel interface.

Figure 13:
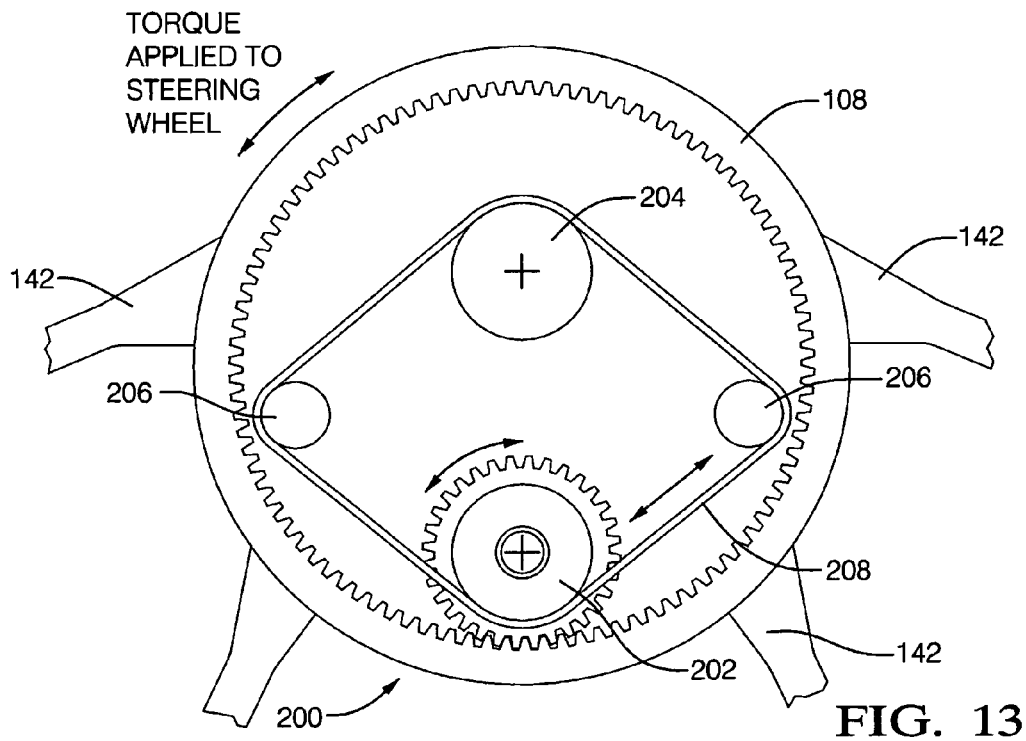
FIG. 13 is a schematic diagram of a belt drive mechanism.

In FIG. 13 an alternative embodiment is disclosed wherein the gear system includes a belt drive mechanism 200. The belt drive mechanism 200 comprises the ring gear 108 rotatable about a first axis and is connected to the steering wheel 102. The belt drive mechanism 200 also includes a set of idler gears 206; a first spur gear 204 coupled to the steering shaft 106 and a second spur gear 202 in intimate and mutual engagement with the ring gear 108. An endless belt 208 continuously encircles the spur gear 202, the gear spur 204 and the idler gears 206. Thus, torque applied to the steering wheel 102 via struts 142 is transmitted to the steering shaft or column 106 directly through the belt drive mechanism 200. Thus, torque applied to the steering wheel 102 is transmitted to the steering shaft or column 106 directly through the planet gear system 104. The resultant rotation of the steering shaft or column 106 is in the same direction as the rotation of the steering wheel steering wheel 102. Typical gear ratios between the second spur gear 202 and the ring gear 108 are about 1:4.

As best understood from FIG. 13, the housing 116, 118 encompasses or encloses the belt drive mechanism 200 and is assembled by fasteners 126, 126a (FIG. 3) such that the housing 116, 118 is fixed to the vehicle 10 (FIGS. 1 and 2) and thus, remains in a stationary position during the clockwise or counterclockwise rotation of the steering wheel 102.

FIG. 14 illustrates an exploded view of an alternative configuration of the gear system of FIG. 3. In FIG. 14, three bolts are used to fasten housings 116 and 118 together, wherein one of the bolts passes through a portion of openings 122 and 120. FIG. 14 also illustrates additional bearings, seals and springs for ensuring the rotation of spur gear 110 with ring gear 108 as well as openings 120 and 122 and housing 116, 118 to provide a means for providing a stationary air bag module while also using an existing steering column design. Thus, no modifications are necessary to the steering column except for an adjustment at the steering wheel interface to accommodate for the offset at the gears. In fact, each of the aforementioned embodiments are contemplated for use with or securement to an existing steering column shaft thus, no modifications are necessary to secure the steering wheel of the present application.

Thus, based upon the foregoing description, an automotive steering wheel-airbag module assembly has been disclosed comprising a rotatable steering wheel encompassing an accessible space; a gear system coupled to the steering wheel and to a steering shaft for transferring torque applied to the steering wheel directly to the steering shaft; and an airbag module positioned within the accessible space encompassed by the steering wheel; wherein the airbag module remains in a stationary position during rotation of the steering wheel.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein by reference are not to be construed as limiting to the claims.

What is claimed is:

1. A gear system for coupling a steering wheel to a steering wheel shaft, comprising:
   a first gear rotatable about a first axis and connected to the steering wheel, wherein rotation of the steering wheel causes rotation of the first gear;
   a second gear engaged to the first gear and configured to rotate about another axis when the steering wheel is rotated, wherein the another axis is displaced from the first axis; and
   a housing disposed about the gear system, wherein the housing remains in a stationary position during rotation of the steering wheel.

2. The gear system as in claim 1, wherein the housing provides a mounting surface for an airbag module.

3. The gear system as in claim 2, wherein the housing defines an arcuate opening disposed between the second gear and the first gear.

4. The gear system as in claim 3, wherein the first gear is a ring gear and the second gear is a spur gear and the spur gear is configured to be coupled to the steering wheel shaft.

5. The gear system as in claim 1, wherein the housing further comprises an aperture that remains stationary during rotation of the steering wheel.

6. The gear system as in claim 5, wherein the aperture is arcuate in shape.

7. A steering wheel/airbag module assembly for use in a vehicle, the assembly comprising:
   a steering wheel;
   a gear system coupled to the steering wheel and configured for transferring torque applied to the steering wheel, the gear system comprising:
      a first gear rotatable about a first axis and connected to the steering wheel; and
      a second gear engaged to the first gear and configured to rotate about another axis, wherein the another axis is displaced from the first axis;
   a housing disposed about the gear system, wherein the housing remains in a stationary position during rotation of the steering wheel; and
   an airbag module mounted to the housing.

8. The steering wheel/airbag module assembly as in claim 7, wherein the housing comprises: a first housing portion and a second housing portion positioned in opposition to the first housing portion, the first housing portion and the second housing portion defining an opening.

9. The steering wheel/airbag module assembly as in claim 7, wherein the opening is disposed between the second gear and the first gear and wherein the opening is arcuate in shape.

10. The steering wheel/airbag module assembly as in claim 9, wherein the airbag module is configured for use without a clock spring coil.

11. A steering wheel/airbag module assembly for use in a vehicle, the assembly comprising:
   a steering wheel;
   a gear system coupled to the steering wheel and configured for transferring torque applied to the steering wheel, the gear system comprising:
      a first gear rotatable about a first axis and connected to the steering wheel; and
      a second gear engaged to the first gear and configured to rotate about another axis, wherein the another axis is displaced from the first axis;
   a housing disposed about the gear system, wherein the housing defines an opening that remains stationary during rotation of the steering wheel; and
   an airbag module mounted to the housing.

12. The steering wheel/airbag module assembly as in claim 11, wherein the housing further comprises a first plate and a second plate positioned in opposition to the first plate, the first plate and the second plate defining the opening, wherein the opening is disposed between the second gear and the first gear and an electrical connector of the airbag module passes therethrough.

13. The steering wheel/airbag module assembly as in claim 12, wherein the first gear is a ring gear and the second gear is a spur gear.

14. The steering wheel/airbag module assembly as in claim 11, wherein the opening is arcuate in shape and the first gear is a ring gear and the second gear is a spur gear.

15. The steering wheel/airbag module assembly as in claim 11, wherein the airbag module is configured for use without a clock spring coil.

16. A steering wheel/airbag module assembly for use in a vehicle, the assembly comprising:
- a rotatable steering wheel;
- a gear system coupled to the steering wheel and being configured for transferring torque applied to the steering wheel, wherein the gear system comprises: a first gear rotatable about a first axis and connected to the steering wheel, wherein rotation of the steering wheel causes rotation of the first gear and a second gear engaged to the first gear, the second gear being configured to rotate about another axis, wherein the another axis is displaced from the first axis; and
- a housing disposed about the gear system, the housing being configured to receive and support an airbag module and wherein the housing remains in a stationary position during rotation of the steering wheel.

17. The steering wheel/airbag module assembly as in claim 16, wherein the airbag module is configured for use without a clock spring coil.

18. The steering wheel/airbag module assembly as in claim 16, wherein the housing comprises:
- a first plate including a first aperture therein; and
- a second plate positioned in opposition to the first plate, the second plate including a second aperture aligned with the first aperture, wherein the first aperture and the second aperture remain stationary during rotation of the steering wheel, and wherein the first aperture and the second aperture define an arcuate opening disposed between a portion of the second gear and a portion of the first gear and an electrical connector of the airbag module passes therethrough.

19. The steering wheel/airbag module assembly as in claim 18, wherein the first gear is a ring gear and the second gear is a spur gear.

20. The steering wheel/airbag module assembly as in claim 16, wherein the opening is arcuate in shape and the first gear is a ring gear and the second gear is a spur gear.

* * * * *